Feb. 7, 1961 E. J. DIEBOLD 2,971,146
INSTANTANEOUS TRIP FOR RECTIFIER PROTECTION
Filed Feb. 20, 1957 3 Sheets-Sheet 1
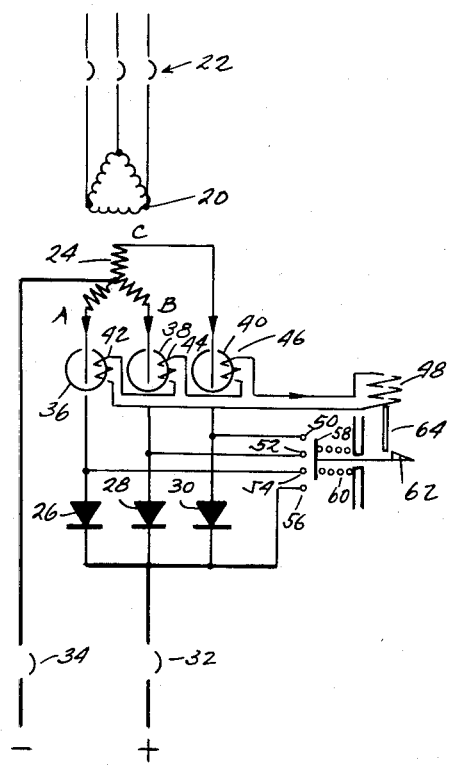
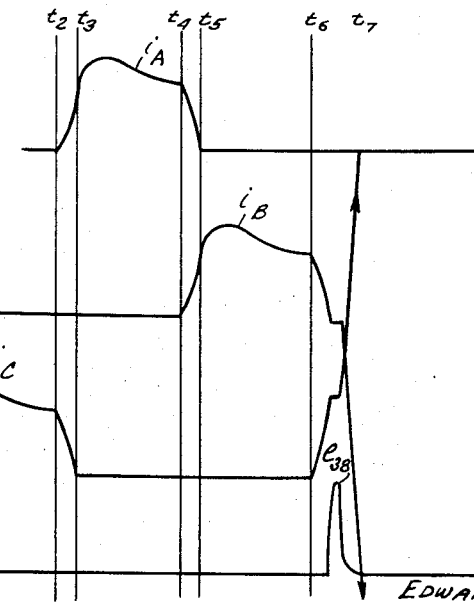
INVENTOR.
EDWARD JOHN DIEBOLD
BY
ATTORNEYS Feb. 7, 1961 E. J. DIEBOLD 2,971,146
INSTANTANEOUS TRIP FOR RECTIFIER PROTECTION
Filed Feb. 20, 1957 3 Sheets-Sheet 2

INVENTOR.
EDWARD JOHN DIEBOLD
BY
ATTORNEYS

Feb. 7, 1961 E. J. DIEBOLD 2,971,146
INSTANTANEOUS TRIP FOR RECTIFIER PROTECTION
Filed Feb. 20, 1957 3 Sheets-Sheet 3

INVENTOR.
EDWARD JOHN DIEBOLD
BY
ATTORNEYS

United States Patent Office 2,971,146
Patented Feb. 7, 1961

2,971,146

INSTANTANEOUS TRIP FOR RECTIFIER PROTECTION

Edward John Diebold, Palos Verdes Estates, Calif., assignor to I-T-E Circuit Breaker Company, Philadelphia, Pa., a corporation of Pennsylvania Filed Feb. 20, 1957, Ser. No. 641,301

5 Claims. (Cl. 321—11)

My invention relates to a circuit for operating protective equipment responsive to fault conditions and more specifically relates to circuitry for activating short-circuiting equipment for short-circuiting and thereby protecting rectifier elements of a rectifier system responsive to a backfire.

Multiphase power rectifiers of the type set forth in my U.S. Patent No. 2,817,805, issued December 24, 1957, entitled Flux Reversal Circuit for Commutating Reactors of Mechanical Rectifiers, and assigned to the assignee of the instant invention, are subject to failures known as arc-backs or backfires wherein a rectifying element carries current in the reverse direction. The normally operating rectifying elements of the other phases see the backfiring element as a short circuit on the A.-C. power supply and the current through the short circuit is limited only by the leakage reactance and the internal resistance of the power system and the rectifier transformer. If the load of the rectifier itself is active (battery or electro-chemical cells), a large reverse D.-C. current also flows into the rectifier from the load.

Since the sum of these currents can increase at several million amperes per second, protective equipment should operate as fast as possible. Thus, the trip system should detect a backfire as early as possible.

In the past, rectifying devices such as mechanical rectifiers, and metallic or semi-conductor diodes, which are quickly destroyed by the heat produced by the fault currents have been protected by by-passers or short-circuiters of the type set forth in copending application, Serial No. 677,631, filed August 12, 1957, entitled Explosive Type Short Circuiter, to Otto Jensen and assigned to the assignee of the instant invention. Such by-passers operate in one millisecond or less, and thus afford a protection of the rectifying elements before the current has time to build up to a destructive amount, and before the sound rectifying elements of the other phases have a chance to carry the fault current. These protective by-passers are heavy contactors providing a direct metallic by-pass to all rectifying elements whenever they are tripped.

The presently used trip circuits of the by-passers are operated by a differential transformer with a saturable iron core. This transformer is magnetized in the positive direction by the D.-C. output of the rectifier, and in the negative direction by a D.-C. winding connected to copper-oxide rectifiers which are energized from current transformers inserted into the A.-C. leads of the rectifier. During normal conditions, the D.-C. winding ampere turns are equivalent to the ampere turns due to the D.-C. output, and the magnetic core has no net ampere turns applied thereto. A small D.-C. bias is then added in the positive direction to keep the core saturated.

Upon the occurrence of a fault on any rectifier element, the D.-C. output decreases, whereas the A.-C. input increases, and the differential trip transformer above described is magnetized in the negative direction, going through a short period of de-magnetization which generates a voltage pulse in any auxiliary winding situated on the transformer core. This pulse then is used to trip the by-passers.

This system, however, is subject to many disadvantages. First, the circuit requires many components; that is, at least three current transformers, six copper-oxide rectifiers and a differential transformer having windings which can carry twice the full ampere-turns of the D.-C. output of the rectifier for a single three-phase rectifier.

Secondly, all components must be large enough to stand up under the high over-voltage and over-current conditions occurring during a fault. This is particularly difficult for the current transformers and the dry cell rectifiers.

Furthermore, the tripping time of the circuit is relatively long, because the difference between the input and the output ampere-turns must be at a substantial amount since if the transformer is adjusted too close, any instantaneous or spurious difference between input and output might set it off.

The principle of my invention is to provide a trip circuit wherein a saturable type transformer is connected in each phase to be normally saturated by the unidirectional current flowing through the rectifying elements of that phase. An auxiliary winding from each saturable type transformer is then connected to energize the trip means of protective equipment responsive to the appearance of a voltage pulse on any of the auxiliary windings.

Thus, when current flows in the reverse direction through any of the rectifying elements, the saturable type transformer will be driven to unsaturation and a voltage will appear on its output winding to trip the protective equipment.

During normal operation, however, the unidirectional energization of the saturable type transformer will not cause unsaturation and the appearance of an output signal.

Therefore, my novel circuit overcomes the disadvantages of the above noted prior art device since it eliminates the need for current transformers and auxiliary rectifiers and replaces the large differential transformer by relatively small saturable type transformers.

Furthermore, since the individual saturable type transformers are completely saturated in a forward direction by the unidirectional pulse type current flowing therethrough during normal operating conditions, sensitive adjustment of these reactors is not required since a positive voltage output pulse will appear only when the current flowing therethrough reverses, whereby the saturable type transformer is driven through an unsaturated interval.

Still further, the components of my novel circuit are unaffected by over-currents and over-voltages during fault conditions since they do not directly compare inputs and outputs of the system.

Accordingly, a primary object of this invention is to provide a novel trip circuit for rectifier protective devices which operates responsive to a reversal of current.

Another object of this invention is to provide a novel trip circuit which is not affected by over-currents and over-voltages in the case of fault.

A further object of this invention is to provide a novel trip circuit which utilizes a minimum number of small components.

A still further object of this invention is to provide a novel trip means which gives a very powerful tripping pulse for a very short time without requiring power from the outside, and without requiring high power circuit elements.

These and other objects of my invention will become apparent when taken in conjunction with the drawings in which:

Figure 1 shows a schematic diagram of my novel invention as applied to a three-phase half wave diode rectifier which utilizes a by-passer or short-circuiter for protecting the diodes under fault conditions.

Figure 2A shows the current wave shape of phase A of Figure 1.

Figure 2B shows the current wave shape of phase B of Figure 1.

Figure 2C shows the current conditions of phase C of Figure 2A.

Figure 2D shows the output voltage pulse appearing across the saturable type transformer in phase C responsive to a reversal of current in that phase.

Figure 3 shows the flux-current characteristic of the saturable type transformers or impulse coils of Figure 1.

Figure 4 shows a diagram of my novel invention as applied to a three-phase double way mechanical rectifier utilizing two by-passers or short-circuiters for protection of the contacts of the system.

Figure 5 shows the flux-current curve of one of the saturable type transformer devices of Figure 4.

Figure 6A:
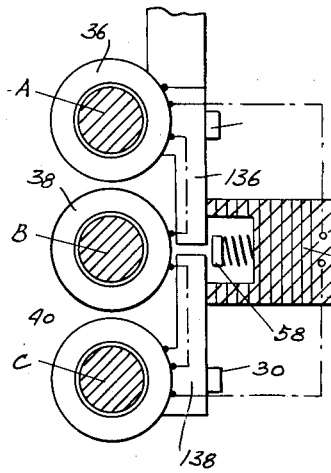
Figure 6A shows a cross-sectional view of a possible physical arrangement of my novel trip system and by-passer as applied to three conductors of a three-phase rectifier system.

Referring now to Figure 1, a three-phase source of power is connected to the delta connected primary winding 20 through the circuit interrupting equipment 22 for energization of the wye connected secondary winding 24 which includes phases A, B and C. Each of phases A, B and C of secondary winding 24 is then connected in series with rectifying elements or diodes 26, 28 and 30 respectively which could be of the semi-conductor or metallic type. The outputs of diodes 26, 28 and 30 are then connected together to form the positive output of the rectifier system taken through the circuit breaker 32 while the negative output is taken from the neutral of the wye connected secondary winding 24, and through circuit breaker 34.

In accordance with my novel invention, each of the conductors of phases A, B and C of secondary winding 24 are taken through iron cores 36, 38 and 40 respectively, these iron cores being of the oriented steel type which exhibit relatively square hysteresis loop characteristics.

As further seen in Figure 1, cores 36, 38 and 40 which are the cores of my novel saturable type transformer have small auxiliary windings 42, 44 and 46 respectively wound thereon.

These windings are connected in series to a trip coil 48 of a by-passing device which for illustrative purposes only is schematically shows in Figure 1 as comprising stationary contacts 50, 52 and 54 which are connected in front of rectifier elements 26, 28 and 30 respectively and stationary contact 56 which is connected to the output lead of each of rectifier elements 26, 28 and 30. A movable contact element 58 is then positioned to movement to bridging contact engagement with each of stationary contacts 50, 52, 54 and 56 so as to substantially short-circuit each of diodes 26, 28 and 30, the movable element 58 being moved to the engaged position by the biasing spring 60 responsive to disconnection of latch member 62 by the cooperating latch and armature member 64 which is moved to the unlatched position responsive to energization of coil 48.

Thus, in the normal operating position latch 62 will maintain contact 58 in a disengaged position so long as the rectifier is properly operating. When, however, a fault condition appears, armature member 64 will be moved to an unlatched position to allow biasing means 60 to move contact 58 to an engaged position to short-circuit diodes 26, 28 and 30 for protection thereof.

So long as the rectifier is operating under normal conditions the current wave shapes of phases A, B and C are those seen as $i_A$, $i_B$, and $i_C$ of Figures 2A, 2B and 2C respectively. Thus, at time $t_1$ the output current is that due to the current $i_C$ of phase C. At time $t_2$ current $i_C$ of phase C commutates with the current $i_A$ (Figure 2A) of phase A until at the time $t_3$ the total load current is that of current $i_A$. At time $t_4$ the current of phase A begins to commutate with the current $i_B$ of phase B (Figure 2B) until at time $t_5$ current $i_B$ is equal to the total load current. During normal operating conditions this operating sequence is cylically repeated whereby a continuous D.-C. output is achieved.

In the event of a backfire, however, or fault condition on any of the diodes of Figure 1, the current flowing therethrough will reverse and flow in a direction opposite the normal direction.

Thus, in Figure 2B it is assumed that diode 28 is faulted so that at the time $t_6$ the current $i_B$, instead of being blocked in the reverse direction, continues to reverse in a negative direction at an extremely rapid rate.

Since diode 28 has faulted and represents a short circuit of phase B, the current flowing through diode 30 of phase C, as seen in Figure 2C, at the time $t_6$ may now increase in the forward direction to an extremely high value whereby damage of diode 30 may follow and in a similar manner the current through diode 26 of phase A would increase in an extremely rapid manner when the voltage between phase A and B is in the forward direction so as to cause subsequent damage to rectifier 26.

In order to avoid this condition, it is desirable to provide a by-pass path for current flow around the undamaged diodes so that they may be protected until the faulted rectifier is cleared from the line by the D.-C. breakers 32 and 34, or the A.-C. breakers 22 in any of many well known manners.

Figures 3, 4, 5:
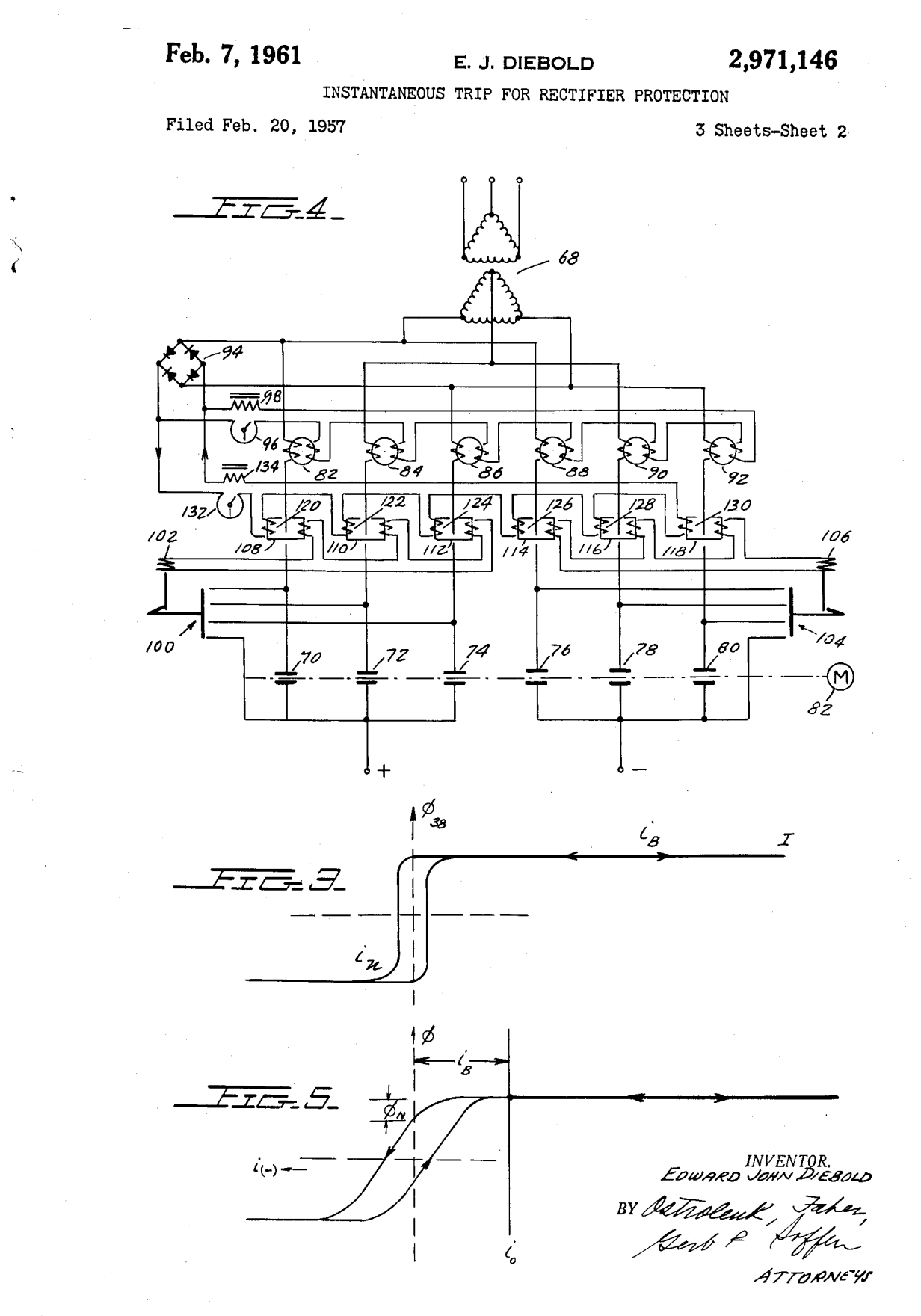

In accordance with my novel invention, the cores 36, 38 and 40 of phases A, B and C respectively during normal operating conditions do not execute an appreciable flux change, as seen in Figure 3 for the case of core 38, since current $i_B$ never decreases below zero.

Under backfire conditions, however, the core will execute a complete flux change, since the current $i_B$ will pass through zero and into a negative region. That is, when current $i_B$ passes through zero, core 38 unsaturates and now acts as a transformer whereby a voltage pulse $e_{38}$ of Figure 2D is induced in the winding 44 of core 38. This pulse is applied across winding 48 of the by-passer to move armature 64 to the unlatched position and unlatch the latch element 62 to allow contact 58 to engage each of contacts 50, 52, 54 and 56. Thus, the diodes 26, 28 and 30 are short-circuited in an extremely short time whereby the diode current of Figure 2C is cut off at a time $t_7$ in view of the by-pass current path provided by the short-circuited contacts so that no damage will occur in diode element 30.

In a similar manner, diode element 26 will carry current in view of its short-circuit path, so that all the unfaulted rectifiers remaining in the system are protected by the rapid closure of a short-circuit path. The unit may thereafter be disconnected from service by normal fault sensing equipment which operates either the D.-C. breakers 32 and 34 or the A.-C. breaker 22 in a manner well known in the art.

Figure 6B:
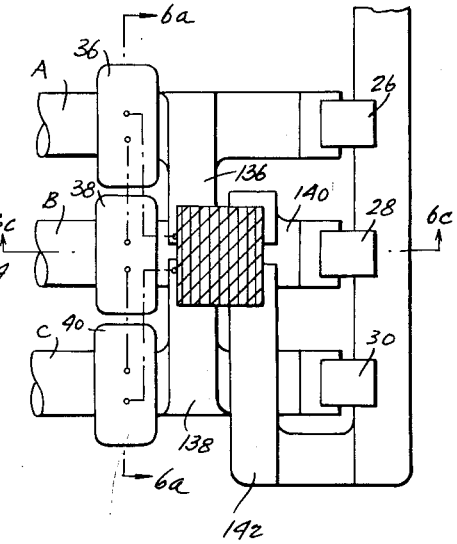
Figure 6B is similar to Figure 6A as taken across the lines 6A—6A of Figure 6B.
Figure 6C:
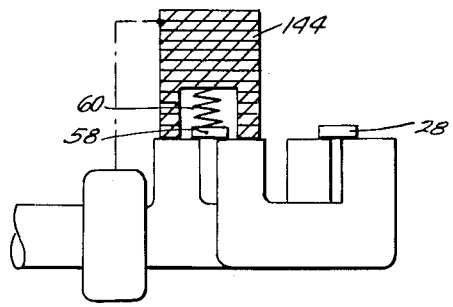
Figure 6C is a view taken across the lines 6C—6C of Figure 6B.

One manner in which the by-passer of Figure 1 and trip circuit elements of Figure 1 could be constructed is set forth in Figures 6A, 6B, and 6C. In these figures it is seen that the toroidal cores which, as will be seen hereinafter, could be formed of stacked laminations of relatively cheap silicon-iron, have the conductors A, B and C passing through the center of toroidal reactors 36, 38 and 40 respectively.

The bus bar arrangement for allowing an interconnection between the buses in front of diodes 26, 28 and 30, and the single bus connected to the inter-connected output of diodes 26, 28 and 30 is then formed by extensions 136, 138 and 140 of conductors A, C and B respectively, and extension 142 of the positive output lead in front of D.-C. breaker 32. The movable contact 58 of the short-circuiter device which is housed within a housing 144 and biased by the biasing means 60 is then positioned to span the ends of each of extensions 136, 140, 138 and 142 which correspond to stationary contacts 50, 52, 54 and 56 respectively, so that movement of contact 58 to a contact engaged position short-circuits the rectifier elements 26, 28 and 30.

Clearly, the arrangement set forth in Figures 6A, 6B and 6C is illustrative of only one arrangement, and many other arrangements can achieve similar results.

A second embodiment of my novel invention is set forth in Figure 4 wherein the delta-delta transformer 68 energizes the three phase two-way rectifier system which, for purposes of illustration, is shown as a mechanical rectifier of the type set forth in my copending application, Serial No. 423,357, filed April 15, 1954, entitled Commutating Reactor Break Pre-Excitation for Mechanical Rectifiers, and assigned to the assignee of the instant invention, and now Patent No. 2,860,301.

More specifically, the mechanical rectifier includes the contact elements 70, 72, 74, 76, 78 and 80 which are synchronously driven into and out of engagement with the motor 82 in proper phase relationship with one another. Each of these contacts is then provided with a commutating reactor 82, 84, 86, 88, 90 and 92 respectively, which provides low current protective steps within which the respective contacts may be opened and closed, as is set forth in copending application, Serial No. 558,350, filed January 10, 1956, entitled Contact Structure for Mechanical Rectifiers, to Otto Jensen, and assigned to the assignee of the instant invention, and now Patent No. 2,851,562. A D.-C. source 94 is then provided to supply pre-excitation energization to auxiliary windings of commutating reactors 82 through 92 over the adjusting rheostat 96 and smoothing choke 98. The operation of this pre-excitation circuit will not be set forth herein since it is well known in the art and is fully described in my above noted copending application Serial No. 423,357, filed April 15, 1954.

Furthermore, it is to be understood that commutating reactors 82 through 92 are capable of having any desired type auxiliary circuit connected thereto such as straightener circuits for adjusting the flux current characteristic of their cores as well as flux reversal circuits for controlling the output voltage of the rectifier.

Each of contacts 70, 72 and 74 are associated with a short-circuiter or by-passer device seen generally at 100, which is identical in operation to the by-passer described in Figure 1, and is operated responsive to energization of trip coil 102.

In a similar manner, contacts 76, 78 and 80 are associated with a by-passer 104 which is operated responsive to energization of coil 106.

My novel trip circuit is then formed by the reactor members 108, 110, 112, 114, 116 and 118, each of these reactor devices being similar in operation to the saturable type reactors 36, 38 and 40 of Figure 1. Thus, auxiliary windings of reactors 108, 110 and 112 are connected in series with trip coil 102 while auxiliary windings of reactors 114, 116 and 118 are connected in series with trip winding 106 of by-passer 104.

The operation of these reactors, if of the saturable type, would be identical to that set forth in the case of Figure 1 whereby the reactors are normally saturated in their forward direction during normal current conditions so that substantially no voltage appears on their auxiliary windings for operation of trip windings 102 or 106. But with the reversal of current through any of the associated contact members 70 through 80 a substantial flux change will be produced within the core so that a strong voltage pulse will be applied to the associated trip coil 102 or 106.

Figure 4, however, shows the manner in which cores of relatively cheap silicon-iron, which are stacked rather than wound, may be utilized with my novel invention.

More specifically, the cores of Figure 4 may exhibit the flux-current characteristic curve set forth in Figure 5. As may be seen in Figure 5, as the primary winding current of transductors 108 through 118 goes from peak current to zero, the transductor will exhibit a flux excursion $\phi_N$ which could be sufficient to induce a voltage to cause operation of an associated by-passer device 100 or 104.

In order to overcome this condition, I provide biasing windings 120, 122, 124, 126, 128 and 130 for cores 108 through 118 respectively which windings are energized from D.-C. source 94 over the rheostat 132 and smoothing choke 134. This biasing current is seen in Figure 5 as $i_B$ which indicates that the effective zero current flow of reactor cores 108 through 118 is now shifted to the right so that when the current of a respective phase decreases to zero the associated reactor will still be substantially saturated and there will be no flux change.

When, however, a rectifying element associated with one of the reactors of Figure 4 is faulted, the current will completely reverse so that instead of being maintained at the point $i_0$ of Figure 5, the current will reverse in the negative direction, as indicated as $i_{(-)}$, and the core will be driven through its complete flux change so as to place an output voltage signal on either of windings 102 or 106 to cause operation of the respective by-passer.

Hence, if the fault occurs on either of contacts 70, 72 or 74 by-passer 100 will be operated to protect the remaining unfaulted contacts, while if the fault occurs on contacts 76, 78 or 80 a by-passer 104 will be operated.

It is to be noted that the use of stacked silicon-iron laminations for reactor cores 108 through 118 could be replaced by the saturable type transformer devices of Figure 1, the stacked type reactor being preferable since it is easier to manufacture and the material is cheaper.

Although I have described preferred embodiments of my novel invention, many variations and modifications will now be obvious to those skilled in the art, and I prefer therefore to be limited not by the specific disclosure herein but only by the appended claims.

I claim:

1. A trip circuit for the by-passer of a multiphase rectifying system; said multiphase rectifying system comprising rectifying elements for each phase; said by-passer being constructed to interconnect the inputs and a common output of each of said rectifier elements to one another responsive to energization thereof; said trip circuit comprising at least one independent magnetic core connected to be substantially saturated by the forward current of one of said rectifier elements; said magnetic core having an output winding directly connected to said by-passer for energizing said by-passer responsive to a substantial voltage across said output winding; the flux of said magnetic core being reversed by current flow through said one of said rectifier elements in the reverse direction to induce a voltage in said output winding to energize said by-passer and short-circuit each of said rectifier elements; said magnetic core having a relatively small cross-sectional area and inducing said output voltage for a relatively short time.

2. A trip circuit for the by-passer of a multiphase rectifying system; said multiphase rectifying system comprising rectifying elements for each phase; said by-passer being constructed to interconnect the inputs and a common output of each of said rectifier elements to one another responsive to energization thereof; said trip circuit comprising at least one independent magnetic core connected to be substantially saturated by the forward current of one of said rectifier elements; said magnetic core having an output winding directly connected to said by-passer for energizing said by-passer responsive to a substantial voltage across said output winding; the flux of said magnetic core being reversed by current flow through said one of said rectifier elements in the reverse direction to induce a voltage in said output winding to energize said by-passer and short-circuit each of said rectifier elements; said magnetic core being a toroidal core having a substantially rectangular hysteresis loop characteristic; said magnetic core having a relatively small cross-sectional area and inducing said output voltage for a relatively short time.

3. A trip circuit for the by-passer of a multiphase rectifying system; said multiphase rectifying system comprising rectifying elements for each phase; said by-passer being constructed to interconnect the inputs and a common output of each of said rectifier elements to one another responsive to energization thereof; said trip circuit comprising at least one independent magnetic core connected to be substantially saturated by the forward current of one of said rectifier elements; said magnetic core having an output winding directly connected to said by-passer for energizing said by-passer responsive to a substantial voltage across said output winding; the flux of said magnetic core being reversed by current flow through said one of said rectifier elements in the reverse direction to induce a voltage in said output winding to energize said by-passer and short-circuit each of said rectifier elements; said magnetic core being formed of stacked laminations, and D.-C. biasing means for biasing said magnetic core to saturation when the current through said rectifier element is substantially zero; said magnetic core having a relatively small cross-sectional area and inducing said output voltage for a relatively short time.

4. A trip circuit for the by-passer of a multiphase rectifying system; said multiphase rectifying system comprising rectifying elements for each phase; said by-passer being constructed to interconnect the inputs and a common output of each of said rectifier elements to one another responsive to energization thereof; said trip circuit comprising at least one independent magnetic core connected to be substantially saturated by the forward current of one of said rectifier elements; said magnetic core having an output winding connected to said by-passer for energizing said by-passer responsive to a substantial voltage across said output winding; the flux of said magnetic core being reversed by current flow through said one of said rectifier elements in the reverse direction to induce a voltage in said output winding to energize said by-passer and short-circuit each of said rectifier elements; said magnetic core being a toroidal core having a substantially rectangular hysteresis loop characteristic; a current conductor conducting current to one of said rectifier elements; said current conductor passing straight through the opening of said toroidal core; said magnetic core having a relatively small cross-sectional area and inducing said output voltage for a relatively short time.

5. A trip circuit for the by-passer of a multiphase rectifying system; said multiphase rectifying system comprising rectifying elements for each phase; said by-passer being constructed to interconnect the inputs and a common output of each of said rectifier elements to one another responsive to energization thereof; said trip circuit comprising at least one independent magnetic core connected to be substantially saturated by the forward current of one of said rectifier elements; said magnetic core having an output winding connected to said by-passer for energizing said by-passer responsive to a substantial voltage across said output winding; the flux of said magnetic core being reversed by current flow through said one of said rectifier elements in the reverse direction to induce a voltage in said output winding to energize said by-passer and short-circuit each of said rectifier elements; said magnetic core being formed of stacked laminations, and D.-C. biasing means for biasing said magnetic core to saturation when the current through said rectifier element is substantially zero; said stacked laminations being formed to surround a current conductor conducting current to said rectifier element whereby said current conductor passes straight through the center of said stacked laminations; said magnetic core having a relatively small cross-sectional area and inducing said output voltage for a relatively short time.

References Cited in the file of this patent
UNITED STATES PATENTS

| | | |
|---|---|---|
| 2,093,342 | Schmidt | Sept. 14, 1937 |
| 2,169,866 | Bedford | Aug. 15, 1939 |
| 2,441,484 | Goldstein | May 11, 1948 |
| 2,503,405 | Olmstead | Apr. 11, 1950 |
| 2,672,584 | Rolf | Mar. 16, 1954 |
| 2,846,636 | Kleinvogel | Aug. 5, 1958 |